United States Patent
Schoeny et al.

(10) Patent No.: US 11,234,357 B2
(45) Date of Patent: Feb. 1, 2022

(54) SYSTEM AND METHOD FOR MONITORING FIELD CONDITIONS OF AN ADJACENT SWATH WITHIN A FIELD

(71) Applicant: CNH Industrial America LLC, New Holland, PA (US)

(72) Inventors: Christopher Schoeny, Yorkville, IL (US); Trevor Stanhope, Darien, IL (US)

(73) Assignee: CNH Industrial America LLC, New Holland, PA (US)

( * ) Notice: Subject to any disclaimer, the term of this patent is extended or adjusted under 35 U.S.C. 154(b) by 170 days.

(21) Appl. No.: 16/053,127

(22) Filed: Aug. 2, 2018

(65) Prior Publication Data

US 2020/0037491 A1 Feb. 6, 2020

(51) Int. Cl.
  *A01D 57/00* (2006.01)
  *A01B 79/00* (2006.01)
  *A01C 21/00* (2006.01)
  *A01B 63/24* (2006.01)

(52) U.S. Cl.
  CPC .......... *A01B 79/005* (2013.01); *A01C 21/005* (2013.01); *A01B 63/24* (2013.01)

(58) Field of Classification Search
  CPC ...... A01B 79/00; A01B 79/005; A01D 27/00; A01D 90/00; A01D 41/14; A01D 41/127; A01D 57/00; G05D 1/00; G05D 1/0016; E01C 23/16; G01C 21/02; B60C 23/02
  See application file for complete search history.

(56) References Cited

U.S. PATENT DOCUMENTS 5,749,783 A * 5/1998 Pollklas ............... A01D 43/073
  414/345
5,991,687 A * 11/1999 Hale ................... A01B 79/005
  342/357.31
5,995,895 A 11/1999 Watt et al.
(Continued)

FOREIGN PATENT DOCUMENTS

RU 2009127622 A * 1/2011 ............. A01D 57/00

OTHER PUBLICATIONS

Variable Rate Seed Technology, Aug. 2, 2015, 1 page. http://www.aces.edu/anr/precision/documents/Variablerateseeding.pdf.
(Continued)

*Primary Examiner* — Yuri Kan
(74) *Attorney, Agent, or Firm* — Rebecca L. Henkel; Rickard K. DeMille

(57) ABSTRACT

A system for monitoring field conditions during the performance of an agricultural operation by an agricultural machine may generally include a support arm configured to be coupled to and extend from an agricultural machine such that, when the agricultural machine makes a pass across a field along a given swath, a portion of the support arm extends across or is positioned over at least a portion of an adjacent swath within the field. The system may also include a sensor provided in association with the support arm, with the sensor being configured to detect a parameter indicative of a field condition associated with the adjacent swath. In addition, the system may include a controller communicatively coupled to the sensor, with the controller being configured to monitor the field condition based on sensor data received from the sensor.

20 Claims, 5 Drawing Sheets

(56) References Cited

U.S. PATENT DOCUMENTS

| | | | |
|---|---|---|---|
| 6,144,910 | A | 11/2000 | Scarlett et al. |
| 7,723,660 | B2 | 5/2010 | Holland |
| 8,451,449 | B2 | 5/2013 | Holland |
| 8,920,260 | B1 | 12/2014 | Azmudeh |
| 9,008,918 | B2 | 4/2015 | Missotten et al. |
| 9,516,802 | B2 | 12/2016 | Zemenchik |
| 9,699,958 | B2 | 7/2017 | Koch et al. |
| 10,295,998 | B2 * | 5/2019 | Yokoyama ............. A01B 63/02 |
| 2009/0118904 | A1 | 5/2009 | Birnie |
| 2012/0265412 | A1 * | 10/2012 | Diekhans ............. A01D 43/086 701/50 |
| 2013/0231968 | A1 | 9/2013 | Willness |
| 2014/0070935 | A1 * | 3/2014 | Wang ................... B60W 40/06 340/443 |
| 2014/0303905 | A1 * | 10/2014 | Jo ........................... G01H 1/00 702/33 |
| 2016/0029545 | A1 | 2/2016 | Matthews |
| 2017/0105337 | A1 * | 4/2017 | Ramsauer ............. A01D 33/00 |
| 2018/0000011 | A1 * | 1/2018 | Schleusner ........... G06T 7/0004 |
| 2018/0108123 | A1 | 4/2018 | Baurer et al. |
| 2018/0155884 | A1 * | 6/2018 | Charnenka ................ B05B 3/14 |
| 2019/0021226 | A1 * | 1/2019 | Dima ................... A01D 34/008 |

OTHER PUBLICATIONS

Case iH Agriculture, Case IH Extends Full Hay and Forage Lineup With Introduction of New Optum Tractor Seriew and New ISOBUS Class 3 Capabilities, Introducing Optum Tractor Series & ISOBUS Class 3 Capabilities, Sep. 1, 2015, 5 pages. https://www.caseih.com/northamerica/en-us/News/Pages/2015-9-1_case_ih_extends_full_hav_and_forage_lineuo.aspx.

* cited by examiner

SYSTEM AND METHOD FOR MONITORING FIELD CONDITIONS OF AN ADJACENT SWATH WITHIN A FIELD

FIELD OF THE INVENTION

The present subject matter relates generally to the systems and methods for monitoring field conditions within a field and, more particularly, to a system and method for estimating and/or recording field conditions associated with an adjacent swath within the field as an associated agricultural machine makes a pass across the field during the performance of an agricultural operation.

BACKGROUND OF THE INVENTION

Agricultural implements, such as planter, seeders, tillage implements, and/or the like, are typically configured to perform an agricultural operation within a field, such as a planting/seeding operation, a tillage operation, and/or the like. When performing such agricultural operations, it is desirable to be able to adjust the operation of the implement to account for variations in the field conditions that could potentially impact the effectiveness and/or efficiency of the operation. In this regard, sensor systems have been developed that allow a given field condition to be detected along the portion of the field across which the implement is currently traveling. Adjustments to the operation of the implement may then be made based on the detected field condition.

However, since such conventional sensor systems are only configured detect field conditions associated with the current portion of the field being traversed by the implement, any adjustments made to the operation of the implement are inherently reactive. As such, conventional systems are unable to respond adequately to sudden or immediate changes in the field condition being detected, which can lead to undesirable results associated with the effectiveness and/or efficiency of the corresponding agricultural operation.

Accordingly, a system and method for monitoring field conditions associated with an adjacent swath within a field as an agricultural machine makes a pass across the field during the performance of an agricultural operation to allow predictive or pre-emptive operational adjustments to be made when making a subsequent pass across the field along the adjacent swath would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a system for monitoring field conditions during the performance of an agricultural operation by an agricultural machine. The system may generally include a support arm configured to be coupled to and extend from an agricultural machine such that, when the agricultural machine makes a pass across a field along a given swath, a portion of the support arm extends across or is positioned over at least a portion of an adjacent swath within the field. The system may also include a sensor provided in association with the support arm, with the sensor being configured to detect a parameter indicative of a field condition associated with the adjacent swath. In addition, the system may include a controller communicatively coupled to the sensor, with the controller being configured to monitor the field condition based on sensor data received from the sensor.

In another aspect, the present subject matter is directed to an agricultural machine including a frame and a marker assembly coupled to the frame. The marker assembly may include a support arm and an associated marker component coupled to the support arm, with the support arm configured to be coupled to and extend from the frame such that, when the agricultural machine makes a pass across a field along a given swath, a portion of the support arm extends across or is positioned over at least a portion of an adjacent swath within the field to allow the marker component to generate a mark along the adjacent swath. The agricultural machine may also include a sensor provided in association with the marker assembly, with the sensor being configured to detect a parameter indicative of a field condition associated with the adjacent swath. In addition, the agricultural machine may include a controller communicatively coupled to the sensor, with the controller being configured to monitor the field condition based on sensor data received from the sensor.

In a further aspect, the present subject matter is directed to a method for monitoring field conditions during the performance of an agricultural operation by an agricultural machine. The method may generally include controlling, with a computing device, at least one operating parameter associated with the operation of an agricultural machine as the agricultural machine makes a first pass across a field to perform an agricultural operation along a first swath within the field, with the agricultural machine including a support arm extending therefrom such that a portion of the support arm extends across or is positioned over at least a portion of an adjacent second swath within the field. The method may also include monitoring, with the computing device, a field condition associated with the adjacent second swath as the agricultural machine makes the first pass across the field based on data received from a sensor provided in association with the support arm. In addition, the method may include adjusting, with the computing device, the operating parameter(s) of the agricultural machine as the agricultural machine makes a second pass across the field to perform the agricultural operation along the adjacent second swath based at least in part on the monitored field condition.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
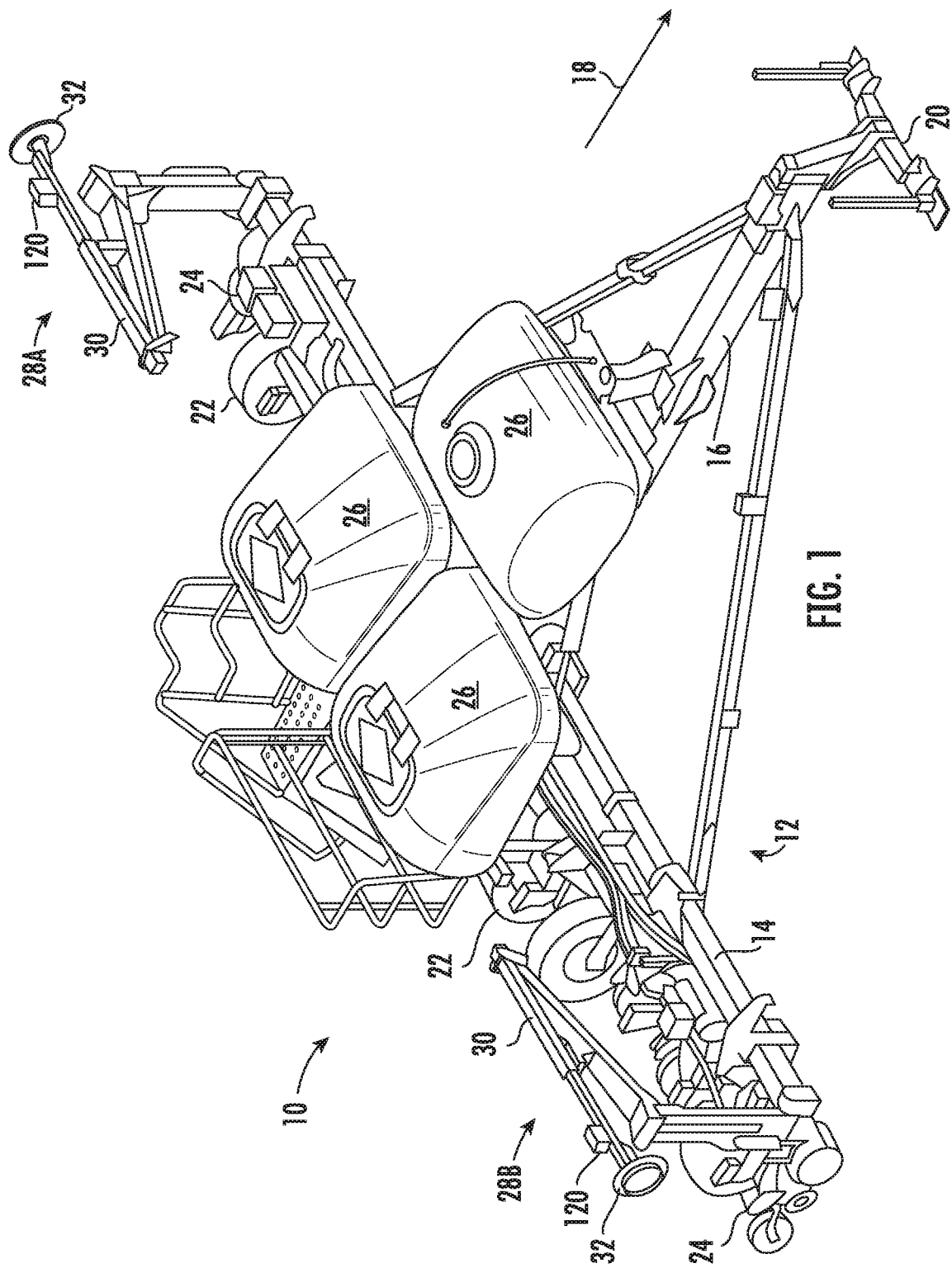
FIG. 1 illustrates a perspective view of one embodiment of an agricultural implement in accordance with aspects of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods for monitoring field conditions associated with an adjacent swath within a field as an agricultural machine (e.g., an agricultural implement and/or vehicle) makes a pass across the field during the performance of an agricultural operation. Specifically, in several embodiments, one or more sensors may be supported on or otherwise provided in association with a support arm extending outwardly from the agricultural machine towards an adjacent field swath to allow the sensor(s) to detect a parameter indicative of a field condition(s) associated with the adjacent swath. In such embodiments, a controller(s) of the disclosed system may be configured to monitor the field condition(s) based on the sensor data received from the sensor(s), including analyzing the sensor data to estimate/determine the field condition(s) and geo-locating the field condition data relative to the field to create a field map that maps or correlates the monitored field condition(s) to various locations along the adjacent field swath. As a result, when the machine makes a subsequent pass across the field along the previously mapped swath, the controller(s) may be configured to actively adjust the operation of the machine in a pre-emptive manner to account for variations in the field condition that will be encountered during the field pass.

In one embodiment, the disclosed sensors may correspond to marker sensors provided in association with the support arms of corresponding marker assemblies of an agricultural implement. As such, while the marker assembly is being used to generate a mark or marker line along an adjacent field swath as the implement is being towed across the field, the associated sensor(s) may be used to detect a parameter(s) indicative of one or more field conditions associated with the adjacent swath to allow the system controller(s) to actively and pre-emptively adjust the operation of the implement or the vehicle towing the implement prior to or during a subsequent pass across the field along the adjacent swath.

It should be appreciated that, for purposes of description, the marker assemblies and associated sensors disclosed herein will generally be described with reference to being installed onto a planter. However, it should be appreciated that, in other embodiments, the marker assemblies and associated sensors may be installed on any other suitable agricultural machine, such as any other suitable agricultural implement (e.g., a seeder, tillage implement, and/or the like) and/or any suitable agricultural vehicle.

Referring now to the drawings, FIG. 1 illustrates a perspective view of one embodiment of an agricultural machine in accordance with aspects of the present subject matter. Specifically, in the illustrated embodiment, the agricultural machine corresponds to an agricultural implement 10, namely a planter. However, in other embodiments, the agricultural machine may correspond to any other suitable agricultural implement, such as a tillage implement, seeder, fertilizer, sprayer and/or the like. In addition, it should be appreciated that, as used herein, the term "agricultural machine" may refer not only to implements configured to be towed or otherwise pulled across a field, but also to the agricultural vehicle (e.g., a tractor) configured to tow or pull such implement(s) across the field and/or the combination of a vehicle/implement. Thus, for example, an agricultural machine may correspond separately to an agricultural vehicle or implement or collectively to the combination of an agricultural vehicle/implement.

As shown in FIG. 1, the implement 10 generally includes a frame 12 comprised of or formed by a plurality of frame members or elements, such as a laterally extending toolbar 14 connected at its middle to a forwardly extending tow bar 16 to allow the implement 10 to be towed by an agricultural vehicle 50 (FIG. 2), such as a tractor, in a direction of travel (e.g., as indicated by arrow 18) (e.g., via an associated hitch 20). The frame 12 may be supported relative to the ground by one or more wheels 22 and may generally be configured to support a plurality of seed planting units (or row units) 24. As is generally understood, each row unit 24 may be configured to deposit seeds at a desired depth beneath the soil surface and at a desired seed spacing as the implement 10 is being towed by a vehicle 50 (FIG. 2), thereby establishing rows of planted seeds. In some embodiments, the bulk of the seeds to be planted or other suitable agricultural materials may be stored in one or more storage tanks 26. Thus, as seeds are planted by the row units 24, a pneumatic distribution system may distribute additional seeds from one or more of the storage tanks 26 to the individual row units 24. Additionally, each row unit 24 may also include one or more individual seed hoppers for locally storing seeds at the row unit 24.

It should be appreciated that, for purposes of illustration, only a portion of the row units 24 of the implement 10 have been shown in FIG. 1. In general, the implement 10 may include any number of row units 24, such as 6, 8, 12, 16, 24, 32, or 36 row units. In addition, it should be appreciated that the lateral spacing between row units 24 may be selected based on the type of crop being planted. For example, the row units 24 may be spaced approximately 30 inches from one another for planting corn, and approximately 15 inches from one another for planting soybeans.

Figure 2:
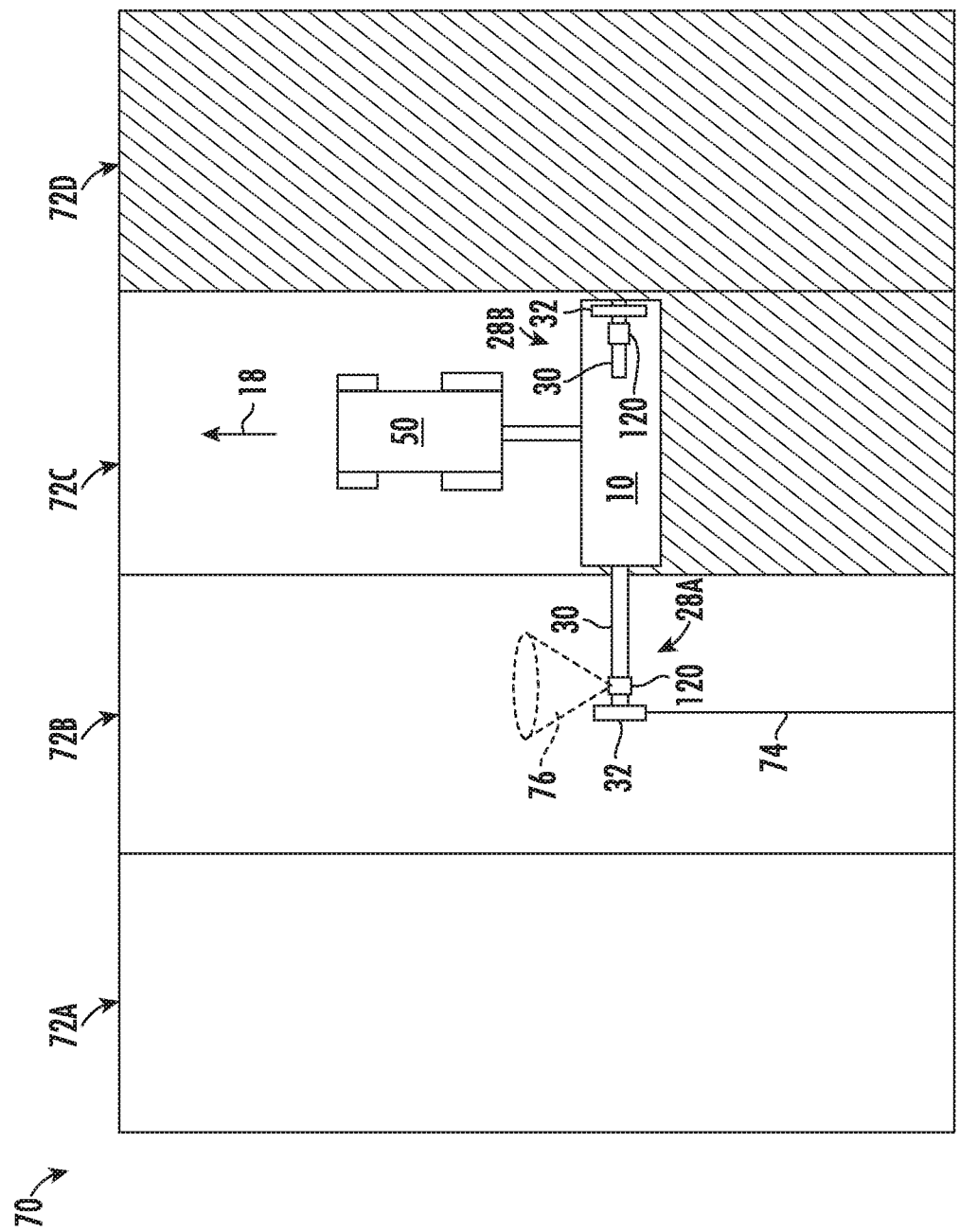
FIG. 2 illustrates a schematic view of an agricultural implement being towed across a field by an associated agricultural vehicle in accordance with aspects of the present subject matter, particularly illustrating a marker assembly of the implement generating a marker line along an adjacent swath of the field while a sensor provided in association with the marker assembly is being used to detect a field condition(s) associated with the adjacent swath.

Additionally, the implement 10 includes a marker assembly 28 coupled to each lateral end of the frame 12, such as a first marker assembly 28A coupled to a first lateral end of the frame 12 and a second marker assembly 28B coupled to an opposed, second lateral end of the frame 12. In general, each marker assembly 28 may include a support arm 30 and an associated marker component 32, such as a marker disc, supported by the arm 30. The arm 30 is generally configured to be extended from a retracted position (as shown in FIG. 1) to an extended position (e.g., as shown in FIG. 2) relative to the frame 12 to allow the marker component 32 to create a mark or marker line in the soil as the implement 10 is towed across the field to help the operator in positioning the implement 10 relative to an adjacent swath when making a subsequent pass across the field. For instance, as will be described below with reference to FIG. 2, the support arm 30 of each marker assembly 28 may be configured to extend outwardly relative to the frame 12 such that the marker component 32 is generally placed in contact with the soil at or adjacent to the center line of the adjacent swath, thereby allowing the operator to utilize the marker line created by the marker assembly 28 to center the implement 10 relative to the marked swath for the next pass. As shown in FIG. 1, the support arm 30 may, for example, correspond to a multi-section arm assembly to allow the arm to be folded or pivoted along its length to move the support arm from its extended position to its retracted position.

It should be appreciated that, in several embodiments, a marker assembly 28 is provided at each lateral end of the frame 12 to allow a marker line to be created in the adjacent field swath regardless of the direction along which the implement 10 is being towed across the field. For instance, when the implement 10 makes a first pass across the field in a first direction, the marker assembly located at one end of the frame 12 (e.g., the first marker assembly 28A) may be used to create a mark along the adjacent field swath. Thereafter, when the implement 10 subsequently makes a second pass across the previously marked swath in a second direction opposite the first direction, the marker assembly located at the opposed end of the frame 12 (e.g., the second marker assembly 28B) may be used to create a new mark along the next adjacent field swath. Additionally, it should be appreciated that each support arm 30 may be configured to be actuated or moved between its extended and retracted positions using any suitable actuation means. For instance, in one embodiment, each marker assembly 28 may include or be associated with an arm actuator 126 (FIG. 3), such as a hydraulic or pneumatic cylinder, to move the corresponding arm 30 between its extended and retracted positions.

It should also be appreciated that the configuration of the implement 10 described above and shown in FIG. 1 is provided only to place the present subject matter in an exemplary field of use. Thus, it should be appreciated that the present subject matter may be readily adaptable to any manner of implement configuration.

Referring now to FIG. 2, a schematic view of the implement 10 shown and described above with reference to FIG. 1 is illustrated in accordance with aspects of the present subject matter, particularly illustrating the implement 10 being towed by an agricultural vehicle 50, such as tractor, across a portion of a field 70 along a current direction of travel 18. As shown, the field 70 may be divided into a plurality of swaths 72, such as a first swath 72A, a second swath 72B, a third swath 72C, and a fourth swath 72D, with each swath 72 corresponding to a strip or row of the field 70 along which the vehicle/implement 50/10 are configured to traverse across the field. It should be appreciated that, for purposes of illustration, the portion of the field 70 shown in FIG. 2 is illustrated as only including four swaths 72. However, in general, any number of swaths 72 may be defined across the field 70.

As shown in FIG. 2, as the vehicle/implement 50/10 makes a pass across the field along a current swath (e.g., swath 72C), the support arm 30 associated with the marker assembly (e.g., the first marker assembly 28A) positioned at the lateral end of the implement 10 adjacent to the next unprocessed field swath (e.g., swath 72B) may be disposed at its extended position such that the marker component 32 engages the ground/soil along the adjacent swath 72B, thereby creating a mark or marker line 74 along the swath 72B as the implement 10 is moved across the current swath 72C while performing an agricultural operation (e.g., a planting operation). As such, when the vehicle/implement 50/10 reaches the end of the field 70 (e.g., at the headlands), the vehicle/implement 50/10 may turn around and make a subsequent pass across the field in the opposite direction along the previously marked swath 72B. In doing so, the operator may utilize the marker line 74 generated by the marker assembly 28A during the previous pass to align the vehicle/implement 50/10 with the center of the marked swath 72B. Additionally, when making the subsequent pass, the second marker assembly 28B may be moved to its extended position to allow the marker assembly 28A to create a new marker line in the next adjacent next unprocessed field swath (e.g., swath 72A) while the first marker assembly 28A may be moved to its retracted position (or at least moved in a manner that raises the associated marker component 32 out of the ground) to prevent disruption of the previously processed portion of the field 70.

Moreover, in accordance with aspects of the present subject matter, each marker assembly 28 may, in several embodiments, include one or more sensors 120 provided in association therewith, with each sensor 120 configured to detect one or more parameters indicative of one or more field conditions associated with the adjacent swath 72B being marked by the corresponding marker assembly 28A as the vehicle/implement 50/10 makes a pass along the current field swath 72C. In such embodiments, the field-related data generated by the sensor(s) 120 may be used by an associated controller(s) of the vehicle 50 and/or implement 10 to monitor the associated field condition(s) of the adjacent swath 72B. The controller(s) may then record the monitored field condition(s) within its memory, including generating a field map that geo-locates the field condition data across the adjacent swath 72B. As such, when the vehicle/implement 50/10 make a subsequent pass across the field 70 along the previously marked/mapped swath 72B, the field condition data may be used to actively control the operation of the vehicle 50 and/or the implement 10, such as by making a one-time adjustment to one or more operating parameters associated with the operation of the vehicle 50 and/or implement 10 prior to making the subsequent pass based on the field condition data generated for the adjacent swath 72B or by actively adjusting one or more operating parameters associated with the operation of the vehicle 50 and/or implement 10 as the vehicle/implement 50/10 make the subsequent pass based on the field condition data to provide on-the-fly adjustments to accommodate localized variations in the monitored field condition(s) along all or a portion of the swath 72B.

For example, in one embodiment, the sensor(s) 120 may be configured to monitor a parameter indicative of the seedbed quality of the adjacent swath 72B, such as by configuring the sensor(s) 120 as an accelerometer or other suitable sensor capable of monitoring the soil roughness of the adjacent swath 72B (e.g., by detecting movement/shaking of the support arm 30 and/or the marker component 32). In such an embodiment, based on the roughness data captured for the adjacent swath 72B, one or more operating parameters associated with the operation of the vehicle 50 and/or implement 10 may be adjusted as the vehicle/implement 50/10 make a subsequent pass along the previously marked/mapped swath 72B to account for variations in the seedbed quality. For instance, the speed of the vehicle 50 may be adjusted based on the monitored seedbed quality, such as by increasing the speed of the vehicle 50 along a section(s) of the swath 72B determined to have a higher seedbed quality (e.g., due to low soil roughness and/or low surface profile variations) and/or decreasing the speed of the vehicle 50 along a section(s) of the swath 72B determined to have a lower seedbed quality (e.g., due to high soil roughness and/or high surface profile variations). As another example, one or more operating parameters of the implement 10 may be adjusted based on the monitored seedbed quality, such as by adjusting the down pressure/force applied to the row units 24 based the seedbed quality along all or a given section(s) of the swath 72B or by adjusting the down pressure/force applied to a row cleaner or closer provided in association with each row unit 24 along all or a given section(s) of the swath 72B.

It should be appreciated that the specific field condition(s) being monitored using the data provided by the sensor(s) 120 may generally vary, for example, depending on the agricultural operation being performed with the field. For example, when performing a planting or seeding operation using a planter or seeder, the monitored field condition(s) may be associated with a given condition(s) that provides useful information for adjusting and/or improving the efficiency and/or effectiveness of the planting/seeding operation, such as seedbed quality (e.g., roughness and/or seedbed depth), moisture content of the soil, soil composition, etc. Similarly, when performing a tillage operation using a tillage implement, the monitored field condition(s) may be associated with a given condition(s) that provides useful information for adjusting and/or improving the efficiency and/or effectiveness of the tillage operation, such as residue coverage, residue size, clod size, seedbed depth, soil compaction (e.g., severity and/or depth), weed management (e.g., location, type, population, and/or maturity), etc. As another example, when performing a spraying operation using a sprayer, the monitored field condition(s) may be associated with a given condition(s) that provides useful information for adjusting and/or improving the efficiency and/or effectiveness of the spraying operation, such as nutrient levels, weed management (e.g., location, type, population, and/or maturity), etc. In general, suitable field conditions that may be monitored in accordance with aspects of the present subject matter using the disclosed sensor(s) 120 may include, but are not limited to, soil roughness or profile, moisture content, soil color, soil composition or type, residue coverage, clod size, organic matter content, soil texture, soil compaction or hardness, depth of soil layers and locations of interlayer boundaries, plant/weed presence, soil porosity, and/or the like.

Additionally, it should be appreciated that the specific type of sensing device or technique used for each sensor 120 may be selected based on the specific field condition(s) to be monitored. Thus, one of ordinary skill in the art would understand a given sensing device or technique may be selected to allow a certain field condition(s) to be monitored. However, in general, the sensor(s) 120 may correspond to a non-contact sensor or a contact sensor. For instance, suitable non-contact sensors may include, but are not limited to, optical sensors (e.g., cameras, including IR cameras, stereo cameras, and/or the like, LIDAR devices and other laser-based sensors, other vision-based sensors, fluorescence or reflectance sensors, and/or the like) radar sensors, including ground-penetrating radars and other electromagnetic-based sensors, ultrasound sensors, and/or the like. Similarly, suitable contact sensors may include, but are not limited to, load sensors, pressure sensors, accelerometers, soil moisture sensors (e.g., galvanic contact resistance sensors), soil conductivity sensors, potentiometers, and/or the like.

It should also be appreciated that each sensor 120 may be installed on, within and/or relative to any suitable component of the marker assembly 28, including the support arm 30, the marker component 32, and/or any other suitable component coupled to the arm 30. For instance, when the relevant sensor(s) 120 corresponds to a non-contact sensor, the sensor(s) 120 may be coupled to a portion of the support arm or marker component 32 such that the sensor(s) 120 has a field of view or sensor detection range (e.g., as indicated by dashed lines 76 in FIG. 2) that is directed towards at least a portion of the adjacent swath 72B being marked by the associated marker assembly 28A. Similarly, when the sensor(s) 120 corresponds to a contact sensor(s), the sensor(s) 120 may be coupled to, incorporated within, and/or form part of a component of the marker assembly 28 configured to contact or engage the ground, such as the marker component 32 or a separate component coupled to the support arm 30. For instance, in one embodiment, a ground-engaging sensor tool (e.g., a separate floating disc or a shank) may be coupled to the support arm 30 to allow the tool to engage or otherwise contact the ground along the adjacent swath 72B. In such an embodiment, the sensor(s) 120 may be coupled to, incorporated within, and/or form part of the tool to allow the sensor(s) 120, for example, to detect loads transmitted through the tool and/or detect movement of the tool so as to provide an indication of the associated field condition(s) being monitored. For example, by providing a sensor(s) 120 in operative association with a floating disc coupled to the support arm 30 that is configured to ride along the seedbed floor, the seedbed depth across the field 70 may be actively monitored.

Additionally, it should be appreciated that, as opposed to being provided in operative association with a corresponding marker assembly 28, each sensor 120 may, instead, be provided in association with any suitable support arm or similar component configured to extend from the implement 10 and/or the vehicle 50 to a location above and/or adjacent to the adjacent field swath 72B without performing any marking function (e.g., an arm without any marker components that is supported above the ground across a portion of the adjacent swath 72B and/or that includes components configured to contact the ground along a portion of the adjacent swat 72Ch). Thus, those of ordinary skill in the art should readily understand that, although the disclosed sensors 120 are generally described herein as being associated with marker assemblies 28, the sensors 120 may be provided in association with any arm or other suitable component that allows the sensors 120 to provide data associated with one or more field conditions of an adjacent field swath 72B as the vehicle/implement 50/10 are making a pass across the field along a separate swath 72C.

Figure 3:
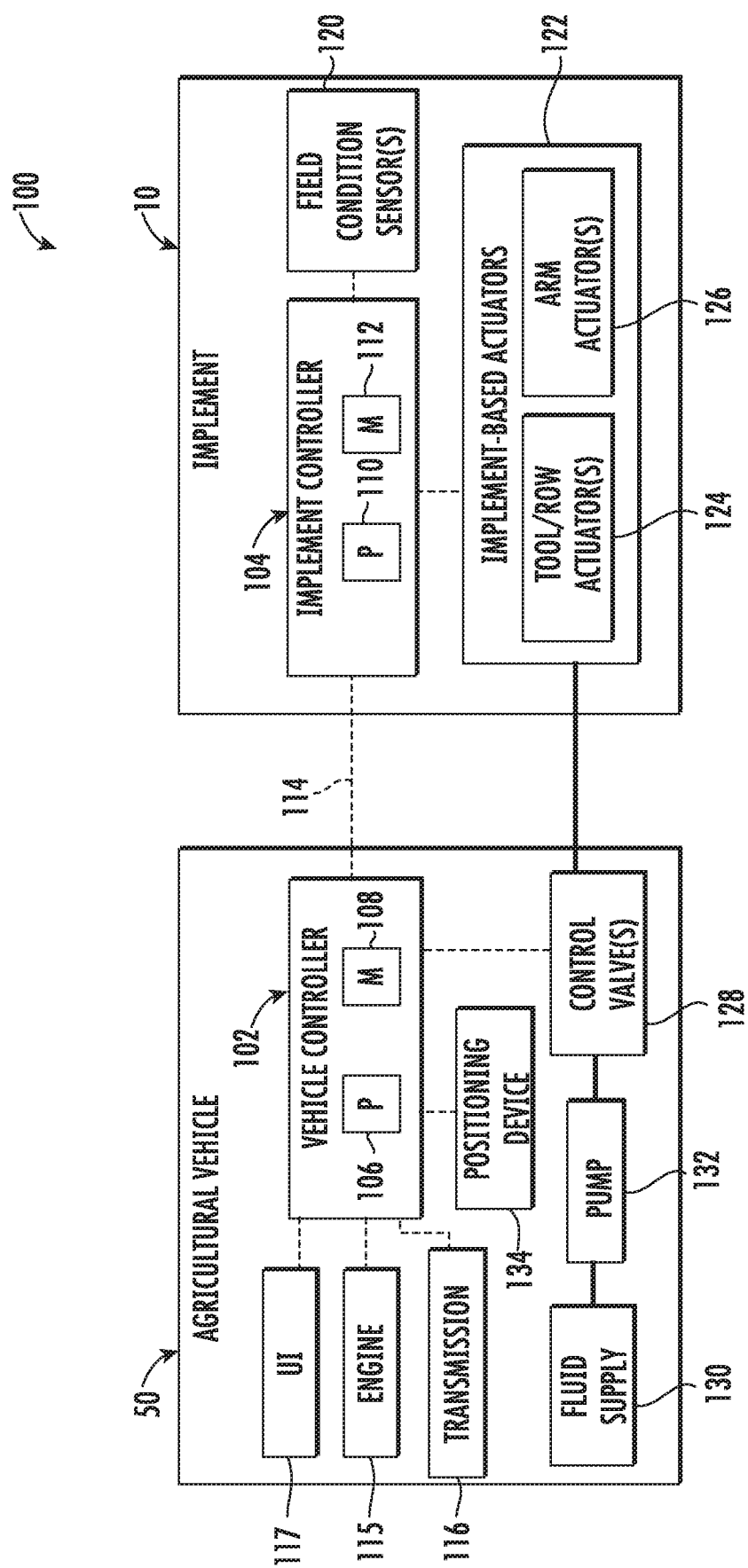
FIG. 3 illustrates a schematic view of one embodiment of a system for monitoring field conditions during the performance of an agricultural operation by an agricultural machine in accordance with aspects of the present subject matter.

Referring now to FIG. 3, a schematic view of one embodiment of a system 100 for monitoring field conditions during the performance of an agricultural operation by an agricultural machine is illustrated in accordance with aspects of the present subject matter. In general, the system 100 will be described herein with reference to the implement 10 and vehicle 50 described above and shown in FIGS. 1 and 2. However, it should be appreciated that the disclosed system 100 may generally be utilized with any suitable implement have any suitable implement configuration and/or with any suitable vehicle having any suitable vehicle configuration. Additionally, it should be appreciated that hydraulic or fluid couplings of the system 100 shown in FIG. 3 are indicated by bold lines. Similarly, communicative links or electrical couplings of the system 100 shown in FIG. 3 are indicated by dashed lines.

As shown, the system 100 includes both a vehicle controller 102 installed on and/or otherwise provided in operative association with the agricultural vehicle 50 configured to tow the implement 10 and an implement controller 104 installed on and/or otherwise provided in operative association with the implement 10. In general, each controller 102, 104 of the disclosed system 100 may correspond to any suitable processor-based device(s), such as a computing device or any combination of computing devices. Thus, in several embodiments, the vehicle controller 102 may include one or more processor(s) 106 and associated memory device(s) 108 configured to perform a variety of computer-implemented functions, such as automatically controlling the operation of one or more components of the agricultural vehicle 50 and/or the implement 10. Similarly, as shown in FIG. 3, the implement controller 104 may also include one or more processor(s) 110 and associated memory devices 112 configured to perform a variety of computer-implemented functions, such as automatically controlling the operation of one or more components of the implement 10 and/or the vehicle 50.

It should be appreciated that, as used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory 108, 112 of each controller 102, 104 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory 108, 112 may generally be configured to store suitable computer-readable instructions that, when implemented by the processor(s) 106, 110 of each controller 102, 104, configure the controller 102, 104 to perform various computer-implemented functions, such as performing the various operations, control functions and/or control actions described herein and/or implementing one or more aspects of the method 200 described below with reference to FIG. 5.

In addition, each controller 102, 104 may also include various other suitable components, such as a communications circuit or module, a network interface, one or more input/output channels, a data/control bus and/or the like, to allow each controller 102, 104 to be communicatively coupled to the other controller and/or to any of the various other system components described herein (e.g., the various field condition sensors 120). For instance, as shown in FIG. 3, a communicative link or interface 114 (e.g., a data bus) may be provided between the vehicle controller 102 and the implement controller 104 to allow the controllers 102, 104 to communicate with each other via any suitable communications protocol. Specifically, in one embodiment, an ISOBUS Class 3 (ISO11783) interface may be utilized to provide a standard communications protocol between the controllers 102, 104. Alternatively, a proprietary communications protocol may be utilized for communications between the vehicle controller 102 and the implement controller 104.

In general, the vehicle controller 102 may be configured to control the operation of one or more components of the work vehicle 50. For instance, in several embodiments, the vehicle controller 102 may be configured to control the operation of an engine 115 and/or a transmission 116 of the work vehicle 50 to adjust the vehicle's ground speed. Moreover, in several embodiments, the vehicle controller 102 may be communicatively coupled to a user interface (UI) 117 of the work vehicle 50. In general, the user interface 117 may include any suitable input device(s) configured to allow the operator to provide operator inputs to the vehicle controller 102, such as a keyboard, joystick, buttons, knobs, switches, and/or combinations thereof located within a cab of the work vehicle 50. In addition, the user interface 117 may include any suitable output devices for displaying or presenting information to the operator, such as a display device. In one embodiment, the display device may correspond to a touch-screen display to allow such device to be used as both an input device and an output device of the user interface 117.

Referring still to FIG. 3, the implement controller 104 may generally be configured to control the operation of one or more components of the implement 10. For instance, in several embodiments, the implement controller 104 may be configured to control the operation of one or more components that regulate the actuation or movement of and/or the down pressure/force applied to any of the components of the implement 12. Specifically, as shown in FIG. 3, in one embodiment, the implement controller 104 may be configured to control the operation of one or more implement-based actuators 122 of the implement 10, such as one or more tool/row actuators 124 (e.g., hydraulic or pneumatic cylinders) configured to control the down force/pressure applied to the row units 24 and/or any associated tools (e.g., row cleaners or closers) and/or to adjust the planting depth of the row units 24, and/or one or more arm actuators 126 (e.g., hydraulic or pneumatic cylinders) configured to actuate or move each support arm 30 between its extended and retracted positions. In such an embodiment, the implement controller 104 may, for example, be communicatively coupled to a control valve(s) (not shown) positioned on the implement 10 for regulating the supply of working fluid to each actuator 122. Alternatively, as shown in FIG. 3, the supply of working fluid to the implement-based actuators 122 may be regulated via one or more control valves 128 located on the vehicle 50. For instance, the control valve(s) 128 may control the supply of working fluid pumped from a fluid supply 130 via an on-board pump 132. In such an embodiment, the implement controller 104 may, for example, be configured to communicate with the vehicle controller 102 to request that the vehicle-based control valve(s) 128 be controlled in a manner that provides for desired operation of the implement-based actuators 122.

As shown in FIG. 3, the implement controller 104 may be also communicatively coupled to each field condition sensor 120 (e.g., the sensor(s) provided in association with each marker assembly 28) to allow the sensor data generated thereby to be transmitted to the implement controller 104 for subsequent processing and/or for subsequent transmittal to the vehicle controller 102. For instance, in one embodiment, the implement controller 104 may be configured to process/ analyze the sensor data to determine the associated field condition(s) of the adjacent swath being marked by the corresponding marker assembly 28. The monitored field condition data may then be stored within the memory 112 of the implement controller 104 and/or transmitted to the vehicle controller 102. Alternatively, the sensor data may be transmitted from the implement controller 104 to the vehicle controller 102 to allow the vehicle controller 102 to process/analyze the sensor data to determine the associated field condition(s) of the adjacent swath. In such an embodiment, the monitored field condition data may then be stored within the memory 108 of the vehicle controller 102 and/or transmitted to the implement controller 104.

Additionally, one or both of the controllers 102, 104 may be communicatively coupled to a positioning device(s) 134 installed on or within the work vehicle 50 and/or on or within the implement 10. In one embodiment, the positioning device(s) 134 may be configured to determine the exact location of the work vehicle 50 and/or the implement 10 using a satellite navigation position system (e.g. a GPS system, a Galileo positioning system, the Global Navigation satellite system (GLONASS), the BeiDou Satellite Navigation and Positioning system, and/or the like). In such an embodiment, the location determined by the positioning device(s) 134 may be transmitted to the controller(s) 102, 104 (e.g., in the form coordinates) and stored within the controller's memory for subsequent processing and/or analysis. For instance, based on the known dimensional configuration and/or relative positioning between the vehicle 50 and each marker assembly 28 and/or between the implement 10 and each marker assembly 28, the determined location from the positioning device(s) 134 may be used to geo-locate each sensor 102 and/or its associated data within the field.

By continuously monitoring the location of the vehicle/implement 50/10 as a pass is being made across the field and by processing the sensor data to estimate or determine the field condition of an adjacent field swath, one or both of the controllers 102, 104 may be configured to generate a field map that correlates the field condition data to various locations along the adjacent field swath. For instance, in one embodiment, the location coordinates derived from the positioning device(s) 134 and the sensor data received from the sensor(s) 120 may both be time-stamped. In such an embodiment, the time-stamped data may allow the sensor data generated by the sensor(s) 120 to be matched or correlated to a corresponding set of location coordinates received or derived from the positioning device(s) 134, thereby allowing a field map to be generated that geo-locates the monitored field condition data along the length of the adjacent field swath.

Figure 4:
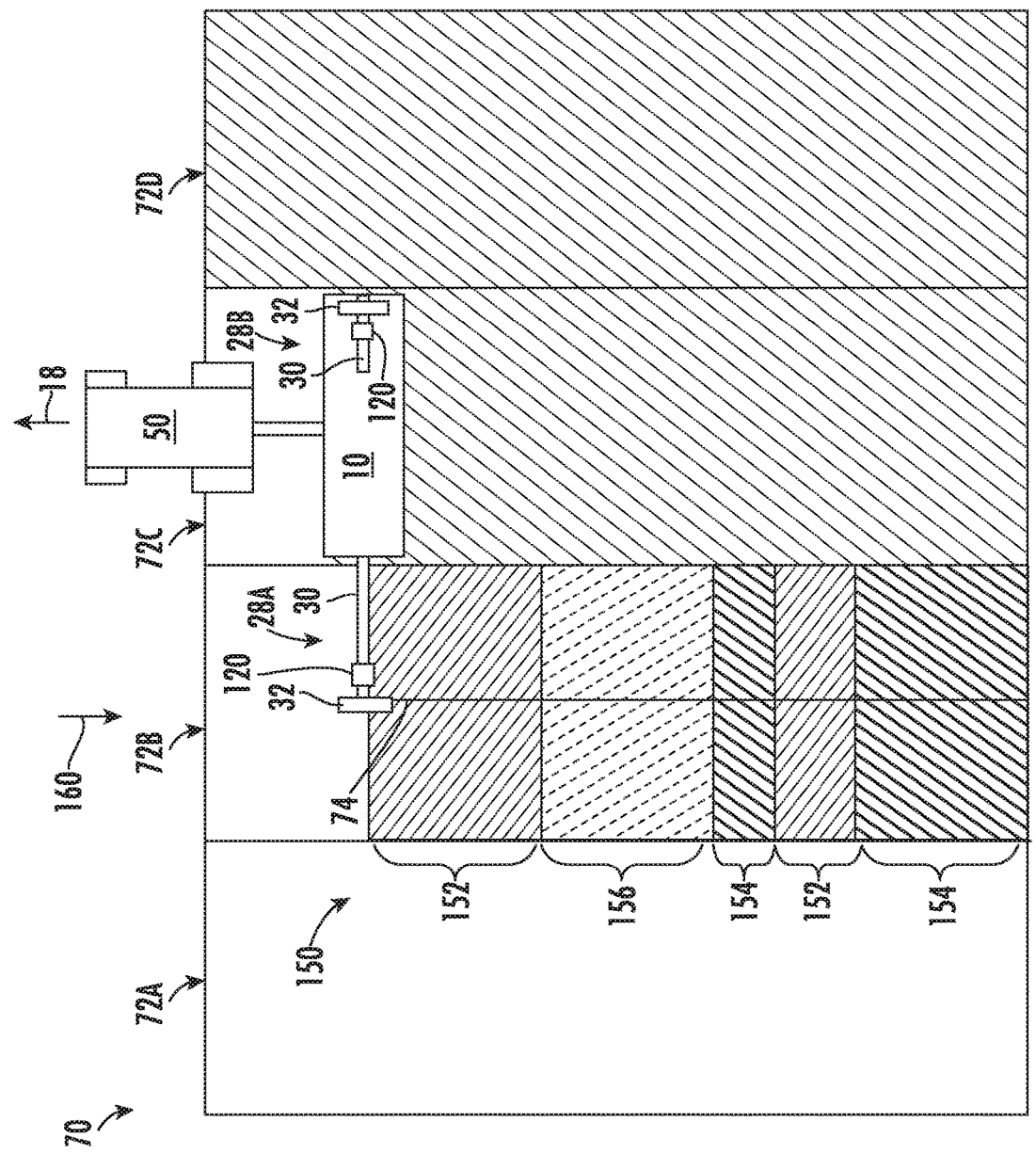
FIG. 4 illustrates another schematic view of the implement, vehicle, and field shown in FIG. 2, particularly illustrating a graphical example of a field map associated with the adjacent swath that correlates the monitored field condition(s) to various locations along the length of the swath.

For example, FIG. 4 illustrates a graphical view of a portion of a field map 150 that maps the monitored field condition data along the adjacent swath 72B being marked by the marker assembly 28A. In general, the field condition data may be geo-located along the adjacent swath 72B such that localized variations in the monitored field condition(s) may be identified and mapped to a corresponding location within the field 70. Specifically, in the illustrated embodiment, the field map 150 identifies variations in the seedbed quality along the adjacent swath 72B as monitored based on the data received from the associated sensor(s) 120. In such an embodiment, by identifying the location of variations in the seedbed quality, the swath 72B may, for example, be divided into separate sections or zones representing varying levels or degrees of seedbed quality. For instance, as shown in FIG. 4, the mapped swath 72B includes two sections or zones 152 along which the swath 72B exhibits high seedbed quality (e.g., due to low surface roughness or insignificant surface profile variations), two sections or zones 154 along which the swath 72B exhibits mid-range seedbed quality (e.g., due to mid-range surface roughness or profile variations), and a single section or zone 156 along which the swath 72B exhibits low seedbed quality (e.g., due to high surface roughness or significant surface profile variations). As will be described below, based on the field map 150 generated from the sensor data and associated location data, the operation of the vehicle 50 and/or the implement 10 may be actively adjusted as the vehicle/implement 50/10 may a subsequent pass across the mapped swath 72B to account for the localized variations in the monitored field condition, such as by increasing the ground speed of the vehicle/implement 50/10 as the implement 10 passes through the high seedbed quality zones 152 and decreasing the speed of the vehicle/implement 50/10 as the implement 10 passes through the low seedbed quality zone 156.

It should be appreciated that, as used herein, a "field map" may generally correspond to any suitable dataset that correlates data to various locations within a field. Thus, for example, a field map may simply correspond to a data table that correlates field condition data to various locations along the swath being mapped or a field map may correspond to a more complex data structure, such as a geospatial numerical model that can be used to identify detected variations in the field condition data and classify such variations into geographic zones or groups, which may, for instance, then be used to generate a graphically displayed map or visual indicator similar to that shown in FIG. 4.

Referring back to FIG. 3, in several embodiments, the vehicle controller 102 and/or the implement controller 104 may be configured to initiate control of the vehicle 50 and/or the implement 10 in order to actively control the operation of the vehicle/implement 50/10 based on the monitored field condition data. Specifically, in one embodiment, the controller(s) 102, 104 may be configured to actively adjust one or more operating parameters associated with the operation of the vehicle 50 and/or the implement 10 to account for variations in the monitored field condition(s) (e.g., based on variations identified in the associated field map 150) as the vehicle/implement 50/10 make a subsequent pass across the field along the previously marked/mapped swath. As a result, the controller(s) 102, 104 may, for example, adjust the operation of the vehicle/implement 50/10 on-the-fly to account for localized variations in the monitored field condition(s) that were identified during the previous pass across the field.

It should be appreciated that the implement controller 104 and/or the vehicle controller 102 may be configured to initiate and/or otherwise perform the various control actions and/or functions describes herein. For instance, in one embodiment, the implement controller 104 may be configured to monitor the relevant field condition(s) and initiate a control action(s) to actively adjust the operation of the implement 10 and/or the vehicle 50 to account for variations in the field condition(s), such as by actively controlling one or more of the components configured to be directly controlled by the implement controller 104 (e.g., the implement-based actuators 122, etc.) or by transmitting a request to the vehicle controller 102 instructing the vehicle controller 104 to adjust the operation of one or more of the components configured to be controlled by such controller 102 (e.g., the engine 115, transmission 117, control valve(s) 128, etc.). Alternatively, the vehicle controller 102 may be configured to monitor the relevant field condition(s) and initiate a control action(s) to actively adjust the operation of the vehicle 50 and/or the implement 10 to account for variations in the field condition(s), such as by actively controlling one or more of the components configured to be controlled by the vehicle controller 102 or by transmitting a request to the implement controller 104 instructing the implement controller 104 to adjust the operation of one or more of the components configured to be controlled by such controller 104. In yet another embodiment, the various control actions/functions may be divided or distributed across the controllers 102, 104.

It should also be appreciated that the operating parameter(s) being adjusted by the controller(s) 102, 104 to account for variations in the monitored field condition(s) may generally vary depending on, for example, the specific field condition(s) being monitored and/or the specific agricultural operation being performed within the field. For example, when monitoring seedbed quality during the performance of a planting or seeding operation, the controller(s) 102, 104 may be configured to adjust the travel speed of the work vehicle 50 (e.g., via control of the engine 115 and/or the transmission 117) or the down force/pressure being applied to the row units 24 and/or the associated tools, such as a row cleaner or closer (e.g., via control of the implement-based actuators 122). Similarly, when monitoring moisture content of the soil during the performance of a planting or seeding operation, the controller(s) 102, 104 may be configured to adjust the planting depth of the row units 24. As another example, when monitoring residue coverage, clod size, and/or seedbed depth during the performance of a tillage operation, the controller(s) 102, 104 may be configured to adjust the travel speed of the work vehicle 50, the penetration depth of one or more of the ground-engaging tools (e.g., shanks, discs, etc.) and/or the down force/pressure being applied to one or more of the ground-engaging tools (e.g., tines, finishing baskets, etc.). As a further example, when monitoring nutrient levels during a fertilizing operation (including when such operation forms part of a seeding/planting operation), the controller(s) 102, 104 may be configured to adjust the application rate/amount of the fertilizer. Thus, it should be apparent that the specific operating parameter(s) being adjusted may be selected to provide desired operation. In this regard, an exhaustive list of potential operating parameters that may be adjusted based on a given monitored field condition(s) has not been provided herewith, but such parameters should be apparent to those of ordinary skill in the art.

As indicated above, in several embodiments, the controller(s) 102, 104 may be configured to actively adjust the operation of the vehicle 50 and/or the implement 10 on-the-fly based on the field map 150 as the vehicle/implement 50/10 make a subsequent pass across the field along the previously mapped/marked swath. For instance, in the example field map 150 shown in FIG. 4 in which the seedbed quality has been mapped along the adjacent swath 72B, the controller(s) 102, 104 may be configured to actively adjust the operation of the vehicle 50 and/or implement 10 as the implement 10 transitions between the differing seedbed quality zones 152, 154, 156 identified within the map 150. For instance, as the vehicle/implement 50/10 travel along the swath 72B in the travel direction indicated by arrow 160 in FIG. 4, the vehicle/implement 50/10 will transition from a high seedbed quality zone 152 to a low seedbed quality zone 156, followed by a mid-range seedbed quality zone 154, another high seedbed quality zone 152, and then another mid-range seedbed quality zone 154. In such instance, as the implement 10 initially transitions from the high seedbed quality zone 152 to the low seedbed quality zone 156, the controller(s) 102, 104 may be configured to actively adjust the operation of the vehicle 50 and/or the implement 10 to account for the reduction in the seedbed quality, such as by slowing down the vehicle/implement 50/10 or by increasing the down pressure/force applied to the row units 24 and/or the associated tools. Thereafter, as the implement 10 transitions from the low seedbed quality zone 156 to the mid-range seedbed quality zone 154, the controller(s) 102, 104 may be configured to actively adjust the operation of the vehicle 50 and/or the implement 10 to account for the improvement in the seedbed quality, such as by increasing the ground speed of the vehicle/implement 50/10 or by reducing the down pressure/force applied to the row units 24 and/or the associated tools. Similarly, as the implement 10 subsequently transitions from the mid-range seedbed quality zone 154 to the following high seedbed quality zone 152, the controller(s) 102, 104 may be configured to actively adjust the operation of the vehicle 50 and/or the implement 10 to account for the further improvement in the seedbed quality, such as by further increasing the ground speed of the vehicle/implement 50/10 or by further reducing the down pressure/force applied to the row units 24 and/or the associated tools. Such active adjustments may be made, as desired, along the entire length of the swath 72B to account for localized variations in the monitored field condition(s).

It should be appreciated that, when the controller(s) 102, 104 is configured to actively adjust the operation of the vehicle 50 and/or the implement 10 to account for localized variations in the monitored field condition(s), it may be desirable for the controller(s) 102, 104 to apply certain thresholds or control rules when determining how and when to make active adjustments. For instance, if the size of a given zone within the field map is below a predetermined size threshold, the controller(s) 102, 104 may be configured to ignore the zone and not make any active operational adjustments as the implement 10 passes across such zone. Similarly, the controller(s) 102, 104 may be configured to apply a variation threshold to determine when to make any active operational adjustments. For instance, if the difference between the monitored field condition(s) along adjacent sections of the field is below a predetermined variation threshold, the controller(s) 102, 104 may be configured to ignore the difference and apply the same operational setting (s) across the adjacent sections of the field. In such an embodiment, the various zones provided within the field map may, for example, be identified based on a set of predetermined variance thresholds such that the difference in the monitored field condition(s) between differing zones is significant enough to warrant adjusting the operation of the vehicle 50 and/or the implement 10 as the implement 10 transitions between such zones.

It should also be appreciated that, as an alternative to actively adjusting the operation of the vehicle 50 and/or the implement 10 as the vehicle/implement 50/10 are making a pass across the previously marked/mapped swath, the controller(s) 102, 104 may be configured to make a one-time adjustment to one or more of the operating parameters of the vehicle 50 and/or the implement 10 prior to or at the initiation of the pass to account for the monitored field condition(s) along the swath. For example, the controller(s) 102, 104 may be configured to statistically analyze the field condition data for the adjacent swatch to determine an average field condition(s) along the swath. In such an embodiment, the controller(s) 102, 104 may be configured to adjust the operating parameter(s) of the vehicle 50 and/or implement 10 to provide optimal or desired operation for the average field condition(s).

Additionally, it should be appreciated that, in one embodiment, the sensor data received from the sensor(s) 102 for a given field swath may be compared to or used in combination with historical or previously obtained data associated with the field being processed. For instance, at the initiation of the agricultural operation being performed within a field, the controller(s) 102, 104 may have a field map stored within its memory that maps previously recorded field condition(s) across the field. In such instance, as the controller(s) 102, 104 receives new sensor data from the sensor(s) 102 for a given swath, the controller(s) 102, 104 may be configured to update the existing field map with the new data. Alternatively, the controller(s) 102, 104 may compare the field condition(s) derived from the new sensor data to the previously mapped field condition(s). Such a comparison may, for example, allow the controller(s) 102, 104 to identify variations between the new data and the previously mapped data that may be indicative of inaccurate sensor data or faulty sensor operation. In such instance, the controller(s) 102, 104 may be configured to notify the operator of the discrepancies in the data (e.g., via the user interface 117). The operator may then be allowed to choose, for example, whether the previously mapped field condition(s), the newly derived field condition(s), and/or a combination of both should be used as the basis for making active adjustments to the operation of the vehicle 50 and/or the implement 10 as the agricultural operation is being performed within the field.

Figure 5:
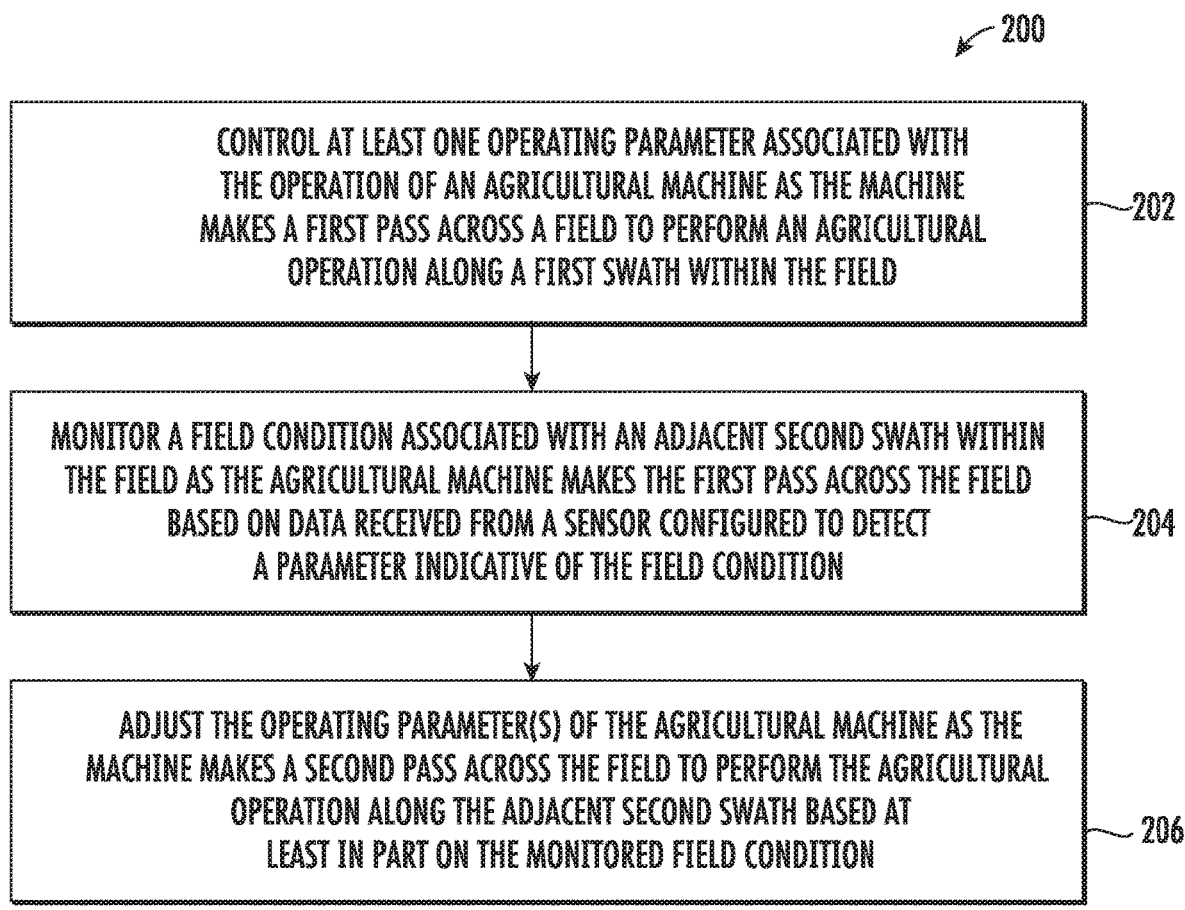
FIG. 5 illustrates a flow diagram of one embodiment of a method for monitoring field conditions during the performance of an agricultural operation by an agricultural machine in accordance with aspects of the present subject matter.

Referring now to FIG. 5, a flow diagram of one embodiment of a method for monitoring field conditions during the performance of an agricultural operation by an agricultural machine is illustrated in accordance with aspects of the present subject matter. In general, the method 200 will be described herein with reference to the system 100 described above with reference to FIG. 3. However, it should be appreciated by those of ordinary skill in the art that the disclosed method 200 may be implemented within any other system having any other suitable system configuration. In addition, although FIG. 5 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 5, at (202), the method 200 may include controlling at least one operating parameter associated with the operation of an agricultural machine as the machine makes a first pass across a field to perform an agricultural operation along a first swath within the field. For instance, as indicated above, the controller(s) 102, 104 may be configured to control the operation of the implement 10 and/or the vehicle 50 as a given pass is being made across a field to perform an agricultural operation.

Additionally, at (204), the method 200 may include monitoring a field condition associated with an adjacent second swath within the field as the agricultural machine makes the first pass across the field based on data received from a sensor configured to detect a parameter indicative of the field condition. For example, as indicated above, the controller(s) 102, 104 may be configured to monitor the field condition(s) of an adjacent field swath based on data received from a sensor(s) 120 coupled to or supported by a support arm extending from the machine towards the adjacent swath within the field.

Moreover, at (206), the method 200 may include adjusting the operating parameter(s) of the agricultural machine as the machine makes a second pass across the field to perform the agricultural operation along the adjacent second swath based at least in part on the monitored field condition. For instance, as indicated above, the controller(s) 102, 104 may be configured to generate a field map that geo-locates the monitored field condition data along the adjacent swath within the field. Thereafter, when the machine makes a subsequent pass across the field along the adjacent swath, the controller(s) 102, 104 may be configured to actively adjust the operation of the agricultural machine to account for variations in the monitored field condition previously identified along the swath.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system for monitoring field conditions during an agricultural operation by an agricultural machine, the system comprising:
   a support arm configured to be coupled to and extend from the agricultural machine such that, when the agricultural machine makes a pass across a field along a given swath, a portion of the support arm extends across or is positioned over at least a portion of an adjacent swath within the field, wherein the adjacent swath is a swath within the field along which the agricultural machine will make a subsequent pass across the field after completing the pass across the field along the given swath;
   a sensor provided in association with the support arm, the sensor being configured to detect a parameter indicative of a field condition associated with the adjacent swath; and
   a controller communicatively coupled to the sensor, the controller being configured to monitor the field condition associated with the adjacent swath based on sensor data received from the sensor, wherein the controller is configured to adjust the operation of the agricultural machine based on the monitored field condition.

2. The system of claim 1, wherein the sensor comprises a non-contact sensor.

3. The system of claim 2, wherein the non-contact sensor is coupled to the support arm such that the non-contact sensor has a sensor detection zone encompassing at least a portion the adjacent swath.

4. The system of claim 1, wherein the sensor comprises a contact sensor.

5. The system of claim 4, wherein the contact sensor is an accelerometer that is configured to detect movement of a component coupled to the support arm when the component contacts the field within the adjacent swath.

6. The system of claim 1, wherein the controller adjusts the operation of the agricultural machine prior to the agricultural machine making a subsequent pass across the field along the adjacent swath.

7. The system of claim 1, wherein the controller is configured to create a field map associated with the monitored field condition, the field map geo-locating the monitored field condition along the adjacent swath.

8. The system of claim 7, wherein the controller is configured to adjust the operation of the agricultural machine based on variations in the monitored field condition identified within the field map as the agricultural machine makes a subsequent pass across the field along the adjacent swath.

9. The system of claim 1, wherein the support arm comprises an extendible arm of a marker assembly of the agricultural machine, and wherein the marker assembly is placed in contact with the field at or adjacent to the center line of the adjacent swath to assist in centering the implement relative to the marked swath for a subsequent pass.

10. An agricultural machine, comprising:
a frame;
a marker assembly coupled to the frame, the marker assembly including a support arm and an associated marker component coupled to the support arm, the support arm configured to be coupled to and extend from the frame such that, when the agricultural machine makes a pass across a field along a given swath, a portion of the support arm extends across or is positioned over at least a portion of an adjacent swath within the field to allow the marker component to generate a mark along the adjacent swath, wherein the adjacent swath is a swath within the field along which the agricultural machine will make a subsequent pass across the field after completing the pass across the field along the given swath;
a sensor provided in association with the marker assembly, the sensor being configured to detect a parameter indicative of a field condition associated with the adjacent swath; and
a controller communicatively coupled to the sensor, the controller being configured to monitor the field condition based on sensor data received from the sensor.

11. A method for monitoring field conditions during an agricultural operation by an agricultural machine, the method comprising:
controlling, with a computing device, at least one operating parameter associated with the operation of the agricultural machine as the agricultural machine makes a first pass across a field to perform an agricultural operation along a first swath within the field, the agricultural machine including a support arm extending therefrom such that a portion of the support arm extends across or is positioned over at least a portion of an adjacent second swath within the field, wherein the adjacent swath is a swath within the field along which the agricultural machine will make a subsequent pass across the field after completing the pass across the field along the given swath;
monitoring, with the computing device, a field condition associated with the adjacent to be processed second swath as the agricultural machine makes the first pass across the field based on data received from a sensor provided in association with the support arm; and
adjusting, with the computing device, the at least one operating parameter of the agricultural machine as the agricultural machine makes a second pass across the field to perform the agricultural operation along the adjacent second swath based at least in part on the monitored field condition.

12. The method of claim 11, wherein monitoring the field condition associated with the adjacent second swath comprises monitoring the field condition based on data received from a non-contact sensor provided in association with the support arm.

13. The method of claim 12, wherein the non-contact sensor is coupled to the support arm such that the non-contact sensor has a sensor detection zone encompassing at least a portion the adjacent second swath.

14. The method of claim 11, wherein monitoring the field condition associated with the adjacent second swath comprises monitoring the field condition based on data received from a contact sensor provided in association with the support arm.

15. The method of claim 14, wherein the contact sensor is provided in association with a component coupled to the support arm that is configured to contact the field within the adjacent second swath.

16. The method of claim 11, further comprising generating a field map based on the data received from the sensor, the field map geo-locating the monitored field condition along the adjacent second swath.

17. The method of claim 16, wherein adjusting the at least one operating parameter of the agricultural machine comprises adjusting the at least one operating parameter based on variations in the monitored field condition identified within the field map as the agricultural machine makes the second pass across the field along the adjacent second swath.

18. The method of claim 16, wherein the variations in the monitored field condition are identified within the field map as separate zones indicating a level or degree of the monitored field condition.

19. The method of claim 11, wherein the support arm comprises an extendible arm of a marker assembly of the agricultural machine, and wherein the extendible arm is extended when the machine travels in a first direction and is retracted when the machine travels in a generally opposing second direction.

20. The method of claim 19, wherein monitoring the field condition associated with the adjacent second swath comprises monitoring the field condition while the marker assembly generates a mark within the field along the adjacent second swath.

* * * * *